United States Patent [19]
Bolles et al.

[11] Patent Number: 5,692,128
[45] Date of Patent: Nov. 25, 1997

[54] COMPUTER NETWORK WITH RELIABLE AND EFFICIENT REMOVABLE MEDIA SERVICES

[75] Inventors: David C. Bolles, Paradise Valley; Alfred Robert Wilkinson, Phoenix, both of Ariz.

[73] Assignee: Microtest, Inc., Phoenix, Ariz.

[21] Appl. No.: 82,083

[22] Filed: Jun. 23, 1993

[51] Int. Cl.$^6$ .................................................. G06F 13/14
[52] U.S. Cl. ................ 395/200.09; 395/200; 395/894; 395/835; 395/837
[58] Field of Search ................ 395/600, 275, 395/325, 700, 425, 200, 650, 775, 500, 894, 837, 835, 200.09, 200.11; 370/85.5, 60, 96.1, 58.1, 60.1; 361/685

[56] References Cited

U.S. PATENT DOCUMENTS

| | | | |
|---|---|---|---|
| 4,385,382 | 5/1983 | Goss | 370/96 |
| 4,441,162 | 4/1984 | Lillie | 364/900 |
| 4,453,211 | 6/1984 | Askinazi et al. | 364/200 |
| 4,466,063 | 8/1984 | Segarra et al. | 364/200 |
| 4,513,370 | 4/1985 | Ziv et al. | 364/200 |
| 4,590,468 | 5/1986 | Stieglitz | 340/825.5 |
| 4,651,316 | 3/1987 | Kocan et al. | 370/85 |
| 4,694,396 | 9/1987 | Weisshaar et al. | 364/300 |
| 4,858,112 | 8/1989 | Puerzer et al. | 364/200 |
| 5,146,568 | 9/1992 | Flaherty | 395/325 |
| 5,283,638 | 2/1994 | Engberg et al. | 348/14 |
| 5,309,564 | 5/1994 | Bradley et al. | 395/200 |
| 5,321,831 | 6/1994 | Hirose | 395/600 |
| 5,333,266 | 7/1994 | Boaz et al. | 395/200.01 |
| 5,363,487 | 11/1994 | Willmon et al. | 395/275 |

FOREIGN PATENT DOCUMENTS

| | | |
|---|---|---|
| A 0 358 293 | 3/1990 | European Pat. Off. . |
| A 0 374 132 | 6/1990 | European Pat. Off. . |
| A 0 491 463 | 6/1992 | European Pat. Off. . |

OTHER PUBLICATIONS

CAM Furthers the Performance Benefits of SCSI Peripherals Roger, Stoller & Chris Borgers.

Advanced SCSI Programming Interface (Manual).

Lanport Fileserver Freedom for Peripherals.

CD–Rom Professional, Nov. 1992, "Using SCSI Express" Howard McQueen, pp. 66–68.

Claiborne; "Devices link Peripherals Directly to Network", *PC Week* Jun. 1991.

Jaffe et al; "CD–ROM Hardware Configurations Selection and Design"; CD–ROM Professional Jan. 1992.

*Primary Examiner*—Larry D. Donaghue
*Attorney, Agent, or Firm*—Snell & Wilmer

[57] ABSTRACT

A computer network (10) includes workstations (12), file servers (14), a cabling system (16), and removable media servers (24). Removable media drives (26) couple to the removable media servers (24), and removable media 30 are removably loaded into the drives (26). The file servers (14) may reside in restricted access areas (22), but no such requirement is placed on the removable media servers (24) or their associated drives (26). A workstation 12 originates a request (64) for removable media data (68). The request (64) is redirected (60) from the workstation (12) through the network (10) to a file server (14). A network operating system (NOS) (84) running on the file server (14) passes the request (64) to a removable media redirector (100), which redirects the request (64) back through the network (10) to a removable media server (24). The removable media server (24) obtains the requested data (68) and routes these data back to the requesting file server (14). The file server (14) then passes the requested data (68) back through the NOS (84), where they are again routed through the network (10), this time to the requesting workstation (12). A database (104) is maintained at the file server (14) for use in managing the use of removable media (30) on the network (10).

12 Claims, 10 Drawing Sheets

COMPUTER NETWORK WITH RELIABLE AND EFFICIENT REMOVABLE MEDIA SERVICES

TECHNICAL FIELD OF THE INVENTION

The present invention relates generally to computer networks, such as local area networks (LANs), wide area networks (WANs), and the like. More specifically, the present invention relates to systems and methods for providing removable media services to users of a network in a manner which efficiently enhances network reliability.

BACKGROUND OF THE INVENTION

In recent years, many organizations have come to intensely rely upon computer networks for their day to day operations. If an organization's computer network becomes inoperable, the organization itself may become inoperable and suffer serious losses. Accordingly, organizations often configure and operate their computer networks to enhance their ability to rely upon the networks and to reduce the chances of network failure.

For example, networks often offer varying levels of security. Users typically log-on to a network from various workstations or file server consoles using secret passwords. The network's security system allows some users, as identified by their passwords, access only to specified portions of the services available through the network. On the other hand, the security system may allow a "supervisor" access to all aspects of the network services. The supervisor is a user who has the job of administering the network and its security. Typically, access to network services is more tightly restricted as the network services become capable of inflicting greater damage to the network. Potentially disruptive network services, such as mounting and dismounting volumes of data, erasing critical network files, and numerous other services, are usually reserved for only a network supervisor. That way, the chances of widespread network devastation which might otherwise result from sabotage or well-intentioned meddling are reduced and network reliability enhanced.

Moreover, organizations often employ physical procedures to enhance network reliability. File servers, which are extremely critical network nodes, are often kept in a locked or otherwise controlled-access room. In a typical organization, only a supervisor can physically access the file server. Consequently, the chances of a network failure resulting from unfortunate meddling with the file server is reduced and network reliability enhanced. In some situations, confidential or secret data are placed on the network for use by specified users, as identified through their passwords. In order to maintain the confidential or secret status of this data, the drives upon which this data are mounted and file servers and associated peripherals with which these drives are associated are locked in a controlled-access room even though no other organizational need requires controlled-access to the file server.

Removable media drives pose serious problems for organizations that wish to maintain high network reliability. Removable media devices include optical disk drives, tape drives, and magnetic drives in which storage media, such as a CD, tape, or disk, may be removed and substituted by users. Conventionally, removable media drives have been attached to either workstations or file servers. But, neither solution satisfactorily achieves high standards for network reliability.

When attached to workstations, removable media drives become personal resources for the users of the workstation more than resources for users of the entire network. For a removable media drive to be useful to the entire network, it and the workstation to which it attaches must be energized before it may be accessed. Likewise, the particular medium which a network user requires must be installed in the removable media drive when it is needed. And, a potential network user must know that a particular medium is available on the network before the network user will use it.

The responsibility for administering the removable media drive for the entire network naturally becomes the responsibility of the users of the workstation to which it is attached. Typically, this network administration task is neither welcomed by the workstation users nor even related to other organizational responsibilities which the workstation users may have. Consequently, these network administration tasks are often performed poorly and in a manner which makes the removable media drives virtually unavailable to other network users.

Another network reliability problem results from installing removable media drives on workstations. When installed on workstations, network users may have to access removable media drives through Terminate-and-Stay-Resident (TSR) and other peer-to-peer programs running on the workstation. Typically, the TSR programs which control network access to a removable media drive exist along with other TSR programs that may be required to implement a network shell and may be used for other tasks performed at the workstation. The use of TSR programs is highly undesirable because they limit the available random-access memory (RAM) available for other tasks performed at the workstation, they often conflict with other programs, and they are often responsible for workstation "crashes." When the installation of removable media drives to network workstation nodes requires the installation of TSR and other peer-to-peer programs on numerous workstations, serious repercussions throughout the network may be expected as a result of the TSR programs. In short, the use of TSR and other peer-to-peer programs leads to poor network reliability.

Attaching removable media drives to file servers solves some of the reliability problems inherent in attaching drives to workstations. The availability of removable media drives for the entire network typically improves because the drives may be administered by the persons who administer file servers, such as network supervisors. Likewise, additional TSR programs are not required before workstations can communicate through a file server to a removable media drive attached thereto, and workstation reliability and performance improves.

However, attaching removable media drives to file servers introduces other serious problems. For example, much of the value of a removable media drive lies in its ability to provide access to virtually an infinite amount of data through the use of different data storage media in the drive. Unfortunately, the sequestration of a removable media drive with a file server in a locked or controlled-access area seriously erodes this value. Of course, a network supervisor might be given the task of administering media availability for the removable media drive. But, this is often an unworkable solution because it imposes a serious burden on the supervisor and is inconvenient to other users.

Moreover, the attachment of a removable media drive to an existing file server typically requires the file server to be taken out of service. This often shuts down the entire network or at least a significant portion of the services offered by the network. In a conventional installation, the file server is powered down and a controller card physically installed in the file server. Often, interrupt numbers, DMA channels, memory space, and/or I/O addresses used by the controller card must be selected so as to avoid conflicts with other portions of the file server's hardware. This selection process is difficult. It requires an extremely thorough understanding of the internal workings of the file server, the keeping of meticulous records concerning these parameters for all portions of the file server's hardware, and/or a thorough and time consuming examination of the file server hardware. Often, this selection process leads to latent errors which cause intermittent network problems that are difficult to trace. All in all, the installation process alone seriously degrades network reliability.

Another solution to the reliability problem posed by removable media drives might be to dedicate an unrestricted-access file server to providing removable media services. But this solution is undesirable due to its inefficiency. File servers are large, complex, and expensive network nodes which are not duplicated frivolously. They are required to run sophisticated and expensive file server network software. This inefficiency is amplified when removable media services are physically required at many different locations.

SUMMARY OF THE INVENTION

Accordingly, it is an advantage of the present invention that an improved computer network which efficiently and reliably provides removable and other media services is provided.

Another advantage is that the present invention provides a method of operating a computer network to efficiently and reliably provide removable and other media services.

Another advantage of the present invention is that one or more simple, reliable, and inexpensive media servers attach to a network's cabling system at convenient locations, whether or not near a file server.

Yet another advantage is that the present invention refrains from using dedicated TSR programs and refrains from requiring dedicated file server hardware.

Yet another advantage is that the present invention may be installed on a running network without even temporarily disabling existing file server or workstation nodes of the network.

Yet another advantage is that the present invention operates under the management provided by existing file server software.

The above and other advantages of the present invention are carried out in one form by a method of operating a computer network to efficiently and reliably furnish removable media services. The method calls for detecting, at a file server node of the network, a request concerning the removable media services. The request is redirected over the network to a removable media server node of the network. The request is then serviced through the removable media server.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
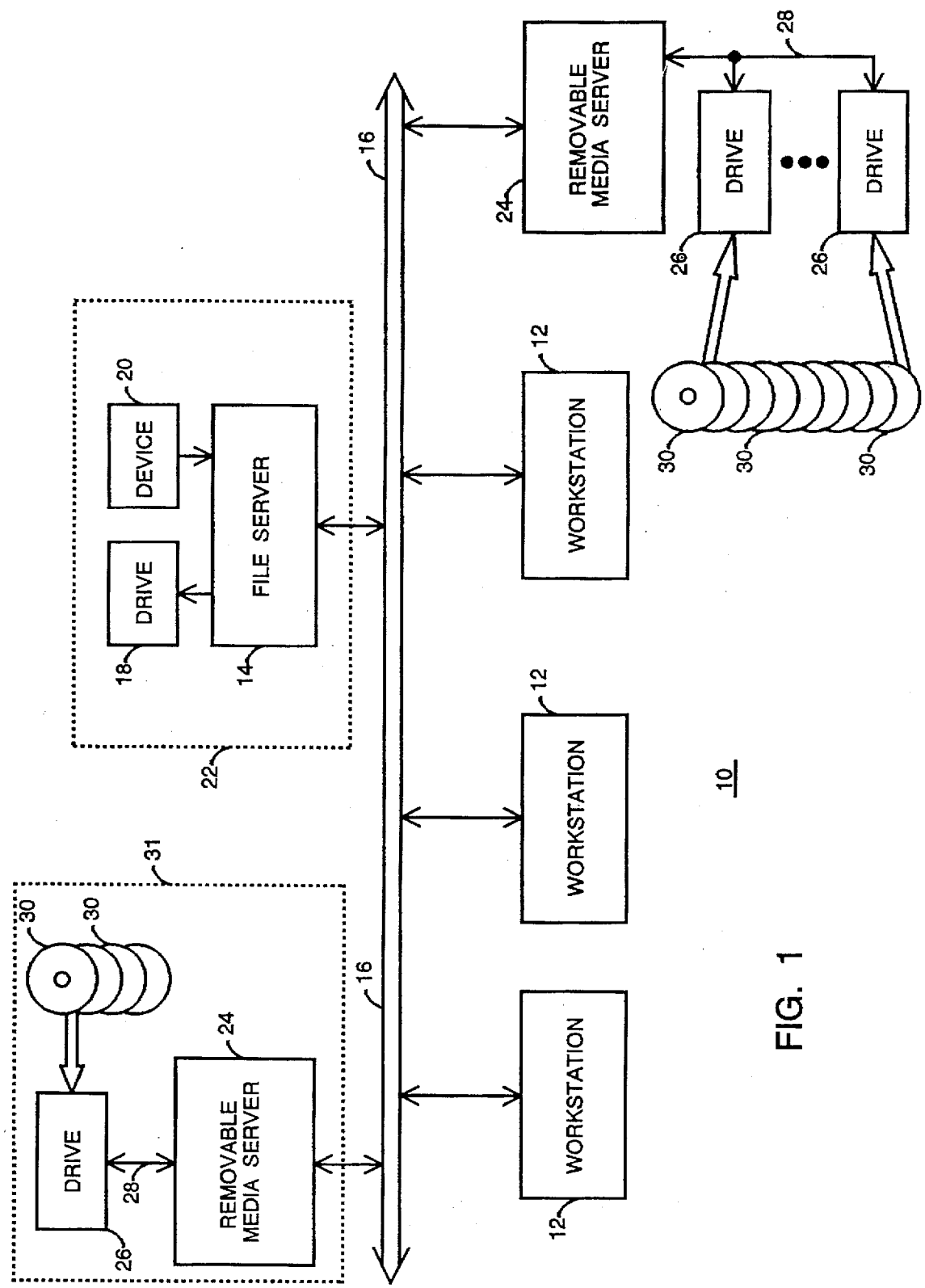
FIG. 1 shows a block diagram of a network within which the present invention may be practiced.

FIG. 1 shows a block diagram of a network 10 within which the present invention may be practiced. Network 10 includes any number of workstations 12 and file servers 14 (only one shown in FIG. 1) interconnected by a cabling system 16. Any conventional network architecture such as Ethernet, Token Ring, ArcNET, and the like, and any conventional network topology such as bus, star, ring, and the like, may be employed by network 10. Moreover, network 10 may include many individual networks (not shown) coupled together through bridges, gateways, and the like (not shown). Likewise, cabling system 16 may employ any connection technology known to those skilled in the art such as twisted pair, coaxial cable, fiber optic cable, radio signals, and the like.

Workstations 12 are computers, and they are nodes of network 10. Workstations 12 run application programs, usually in response to user inputs. Generally speaking, workstations 12 are users or clients for the services offered by network 10. However, when peer-to-peer techniques are employed, the resources, such as files, printers, modems, and the like, available at one workstation 12 may be made available to other workstations 12 of network 10. File servers 14 are also computers and nodes of network 10. File servers 14 provide access to shared data and program files for users of network 10. As is conventional, file servers 14 may have any number of drives 18, devices 20, and other resources or peripherals coupled thereto. Typically, file servers 14 provide the services of drives 18 and devices 20 to users in response to requests received over cabling system 16 from workstations 12.

A file server 14 is preferably located in a restricted access area 22, which FIG. 1 indicates as being surrounded by a dotted line. Physical access to file server 14 may be restricted by placing file server 14 in a locked room or in any other manner known to organizations. Access to file server 14 may be permitted only to a select few persons, such as network supervisors, whose job duties include the administration and security of network 10 or of the organization for which network 10 exists. By restricting access to area 22, the reliability of network 10 improves because the access restrictions limit the possibility of sabotage or well-intentioned meddling with file server 14 and its associated drives 18 and devices 20. Preferably, file server 14 remains continuously energized and operational on network 10. That way, the organization for which network 10 exists may rely on the continued availability of file server 14.

In contrast to file server 14, workstations 12 are located in relatively unrestricted or free access areas. Users of workstations 12 may energize, de-energize, and otherwise meddle with their workstations 12 as they like. Using conventional security precautions administered through password management, activities taking place at a workstation 12 do not jeopardize network 10 as a whole. Of course, those skilled in the art will appreciate that an organization may also restrict access to workstations 12. However, in a preferred embodiment of the present invention, most workstation users are denied free access to area 22.

Network 10 additionally includes any number of removable media servers 24 which couple to cabling system 16. While removable media servers 24 may physically couple to cabling system 16 at any convenient location, such locations are preferably sufficiently far from file server 14 so as to be outside restricted access area 22. Thus, users of network 10 may freely access removable media servers 24. A removable media server 24 couples to any number of removable media drives 26 through a bus 28. In the preferred embodiment, bus 28 represents a conventional Small Computer Systems Interface (SCSI) bus, and up to seven drives 26 may couple thereto. Removable media 30 removably couple to drives 26. In the preferred embodiment of the present invention, drives 26 are conventional optical disc drives and media 30 are conventional Compact Discs (CDs). However, in other embodiments, drives 26 may be magnetic tape drives and media 30 may be magnetic tapes, or drives 26 may be magnetic disk drives and media 30 may be removable magnetic discs. Moreover, while the currently preferred embodiment of the present invention is adapted to serve a type of optical disc known as "Read Only Memory" (CD ROMs), those skilled in the art will appreciate that nothing prevents other types of optical removable media from being accommodated as well.

In another embodiment of the present invention, server 24 is remotely located from file server 14. Server 24 may be placed in a controlled access area 31, while file server 14 may, but need not, be located in a controlled access area. Server 24 may, for example, be separated and placed in a controlled area because it serves confidential, secret, or otherwise sensitive or controlled-access data to certain users of network 10. The same controlled-access requirements need not apply to other data available to network 10, whether directly through file server 14 or through other servers 24. In this situation, server 24 may couple to removable media drives and/or fixed media drives and serve removable media data and/or fixed media data. For convenience, the phrases "removable media," "removable media drives," and the like, shall be deemed to include fixed media, fixed drives, and the like, when applied to this situation.

For practical purposes, an infinite amount of data are available to network 10 and its users through drives 26 and servers 24 because each drive 26 facilitates access to data on any number of media 30. If a medium 30 currently loaded in a drive 26 does not contain desired data or is otherwise improper for a particular network user's needs, an appropriate medium 30 may simply be substituted therefor. Accordingly, for network 10 to fully supply the potential of removable media 30, relatively free access to drives 26, is desirable so that media 30 may be freely substituted as needed.

Generally speaking, in the preferred embodiments of the present invention removable media servers 24 operate under the control of file server 14. Thus, to a user of network 10 data access through removable media servers 24 operates substantially the same as any other data access through file server 14. The fact that removable media server 24 and its associated drives 26 may be remotely located from file server 14 is transparent to the user. This allows the network user to use conventional network commands with which the user may already be familiar in accessing this removable media data. Likewise, application programs that run on a workstation 12 and may communicate with file server 14 need not be altered to access data through removable media servers 24. Furthermore, a portion of the massive assortment of network management features provided by conventional software operating on file server 14 may be adapted for use in connection with removable media 30. Such features include conventional data security features that allow some users access to some data but deny access to other users.

In short, the use of file server 14 to manage removable media 30, drives 26, and removable media servers 24 applies conventional sophisticated file server intelligence, as provided through network software running on file server 14, to removable media 30 without unnecessarily duplicating file server resources. This represents an efficient solution that reduces costs and increases reliability. In addition, removable media server 24 and drives 26 may be installed in network 10 without taking any workstation 12 or file server 14 out of service, without introducing new hardware into any workstation 12 or file server 14, and without installing any TSR or other programs in workstations 12. These installation features further improve network reliability by eliminating the risks associated with the introduction of new hardware and software in existing workstations 12 and file servers 14.

Figure 2:
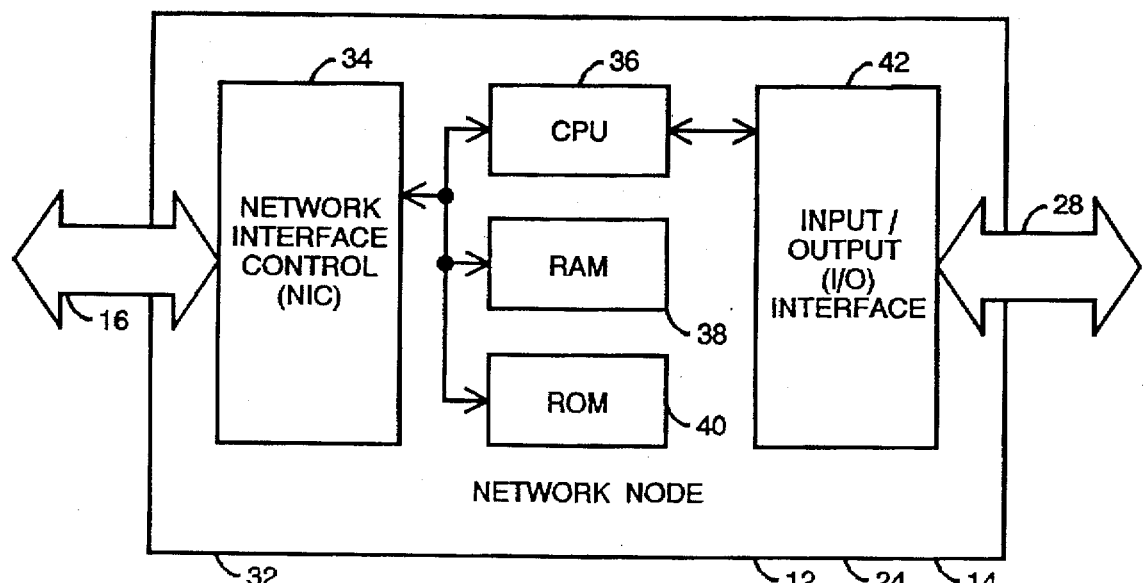
FIG. 2 shows a block diagram of hardware used by a node of the network.

FIG. 2 shows a block diagram of a node 32, such as a workstation 12, file server 14, or removable media server 24, of network 10 (see FIG. 1). Node 32 includes a Network Interface Control circuit (NIC) 34 that couples to cabling system 16. NIC 34 couples to a Central Processing Unit (CPU) 36, which may be provided by a conventional microprocessor circuit. CPU 36 couples to Random Access Memory (RAM) 38, Read Only Memory (ROM) 40, and an Input/Output (I/O) interface 42. Memories 38 and 40 store data which serve as instructions to CPU 36 and which, when executed by CPU 36, cause node 32 to carry out processes which are discussed below. In addition, memories 38 and 40 include variables, tables, and databases that are manipulated due to the operation of nodes 32.

Figure 3:
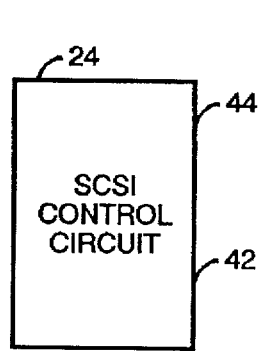
FIG. 3 shows a block diagram of an input/output interface block of a removable media server node of the network.

FIG. 3 shows a block diagram of a preferred I/O interface 42 in a node 32 which operates as removable media server 24 in network 10. Referring to FIGS. 2 and 3, in removable media server 24 I/O interface 42 simply represents a conventional SCSI control circuit 44. Thus, in removable media server 24, I/O interface 42 drives SCSI bus 28.

Figure 4:
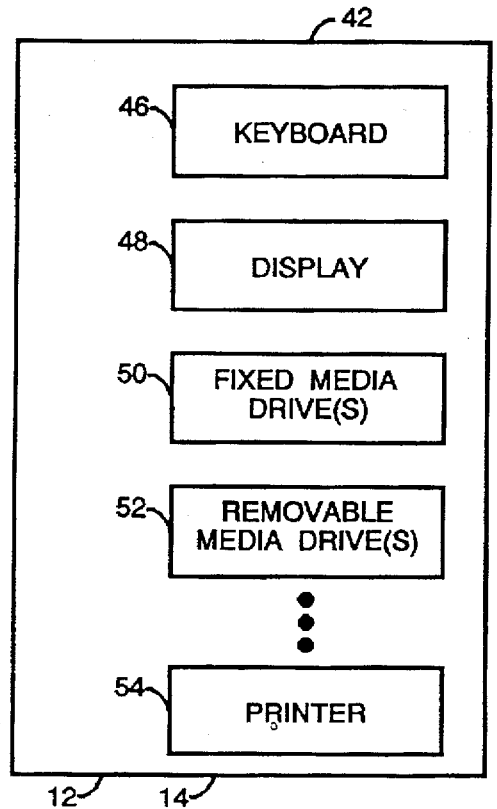
FIG. 4 shows a block diagram of an input/output interface block of workstation and file server nodes of the network.

FIG. 4 shows a block diagram of a preferred I/O interface 42 in a node 32 which operates as a workstation 12 or a file server 14 in network 10. Referring to FIGS. 2 and 4, I/O interface 42 includes a wide assortment of interfaces and hardware which are conventionally used in personal computers. Thus, in workstations 12 and file servers 14, I/O interface 42 may provide one or more of a keyboard 46, a video display terminal 48, fixed media physical drives 50, removable media physical drives 52, printers 54, and other peripherals or devices conventionally coupled to or included in personal computers.

Relatively speaking, the hardware used by removable media server 24 is much simpler and less expensive than that used by a workstation 12 or a file server 14. Removable media server 24 omits a keyboard, video display, and conventional magnetic media drives, whether fixed or removable. Consequently, removable media server 24 is among the most inexpensive and highly reliable nodes 32 of network 10. Moreover, the simplicity of hardware for removable media server 24 leads to a small size that facilitates great flexibility in finding suitable physical locations for removable media server 24.

Figure 5:
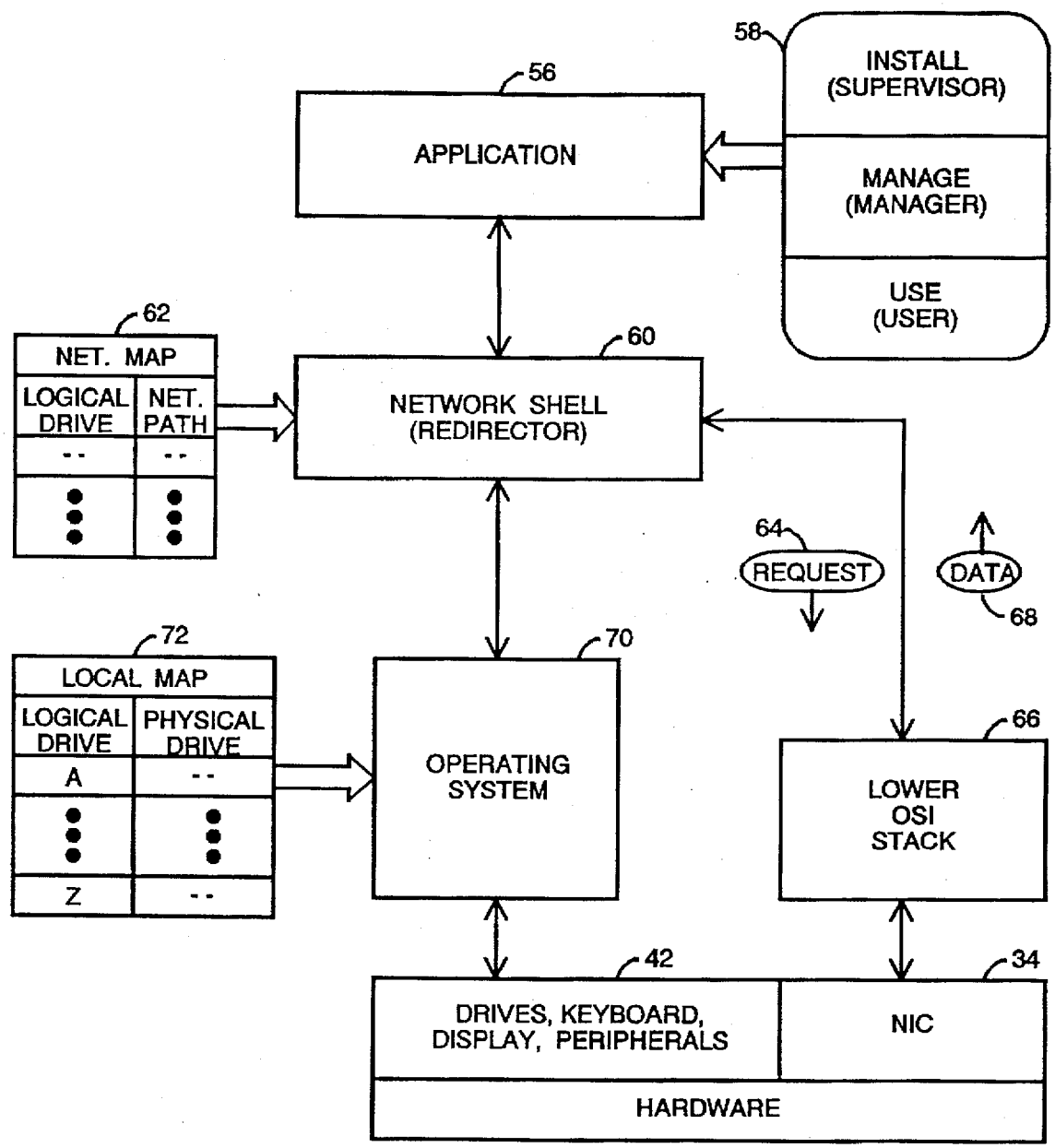
FIG. 5 shows a block diagram of software that operates on a workstation node of the network.

FIG. 5 shows a block diagram of typical software programs that operate on a workstation 12. The processes performed in accordance with this software are arranged in a hierarchy. An application layer or program 56 resides at the top of this hierarchy. Hardware devices and/or peripherals, such as NIC 34 and I/O interface 42 reside at the bottom of this hierarchy. As will be appreciated by those skilled in the art, an application program performs useful work to achieve a specific purpose not related to the computer itself. Examples include spreadsheets, accounting systems, engineering programs, word processors, graphics programs, database managers, games, and the like. Applications 56 are contrasted with utility programs and/or operating systems, which perform work related to the computer itself. User commands entered at a keyboard 46 (see FIG. 4) of a workstation 12 may also be viewed as residing at or originating from the application level for the purposes of this discussion. A removable media management program 58 represents one of a multiplicity of potential application programs 56. Program 58 may represent a network resource which is maintained at file server 14 (see FIG. 1) and loaded on a workstation 12 from file server 14. Program 58 is discussed in more detail below.

FIG. 5 specifically illustrates an embodiment of the present invention that is consistent with a well known NOVELL® NETWARE® local area network (LAN). In this embodiment, when application program 56 requires service from the hardware of workstation 12 or from other portions of network 10, it communicates most directly with a network shell or redirector 60. When shell 60 detects a request for service from hardware, it may consult a network map table 62, an exemplary block diagram of which is shown in FIG. 5. Shell 60 maintains table 62 in memory 38 (see FIG. 2) of workstation 12 to determine if a logical drive or unit number associated with the application's requirement has been equated to or otherwise associated with a network resource. Table 62 may be configured in response to "MAP" commands, which are well known and understood in the above-discussed NETWARE and other LAN environments. When network resources are requested, table 62 desirably identifies a network path that addresses a file server 14 and "volume" associated with the application's requirement. Those skilled in the art will appreciate that a "volume" represents a collection of data accessible through an indicated file server 14. A request 64 for network service is then redirected from workstation 12 and routed through a lower OSI stack program 66 to the NIC 34 (see FIG. 2) of workstation 12.

OSI refers to the well known Open Systems Interconnection (OSI) model that divides networking issues into functions or layers. Layer 7, the highest layer of the OSI model, corresponds to software applications. Layer 1, the lowest layer, corresponds to the physical link or hardware. Layers 6–2 are software layers which reside between layers 7 and 1. Lower OSI stack program 66 performs the functions associated with one or more of layers 2–6 in the OSI model. Those skilled in the art will appreciate that these functions are well known and understood and need not be discussed further herein. Moreover, stack program 66 simply performs the well known functions that cause request 64 to be communicated to a network destination, regardless of whether such functions directly correspond to the OSI model in a particular implementation.

When network 10 responds to request 64, it sends data 68, which are responsive to request 64, back to application program 56. Data 68 are routed back through NIC 34, lower OSI stack program 66, and shell 60. Data 68 may represent data specifically requested through request 64, data that describe potential errors which may have occurred in responding to the request, and/or simply a return of program control to the higher level program.

On the other hand, when shell 60 determines that a request is a local request rather than a network request, the request is routed to the workstation's local operating system 70. Numerous conventional operating systems are known to those skilled in the art. Consequently, operating system 70 is not discussed in detail herein. Typically, the request identifies a logical drive or unit number that should be used in responding to the request. Operating system 70 may consult a local map table 72 which is maintained in memory 38 (see FIG. 2) of workstation 12 to fulfil the request. FIG. 5 shows a block diagram of an example version of table 72. Through table 72, operating system 70 may identify a physical drive or device that corresponds to the logical drive or unit number indicated in the request. After identifying a physical drive or device, operating system 70 may respond to the request by communicating with the indicated physical drive or device. After responding to the request, responsive data are routed back to application 56, perhaps through shell 60.

Those skilled in the art will appreciate that the block diagram shown in FIG. 5 illustrates only one of many diverse architectures which may be used in conventional workstations 12. In alternate embodiments, shell 60 may form an integral portion of operating system 70. In one well known embodiment, operating system 70 communicates with hardware through a Basic Input-Output System (BIOS) (not shown), and network redirector shell 60 resides between the operating system and the BIOS.

Figure 6:
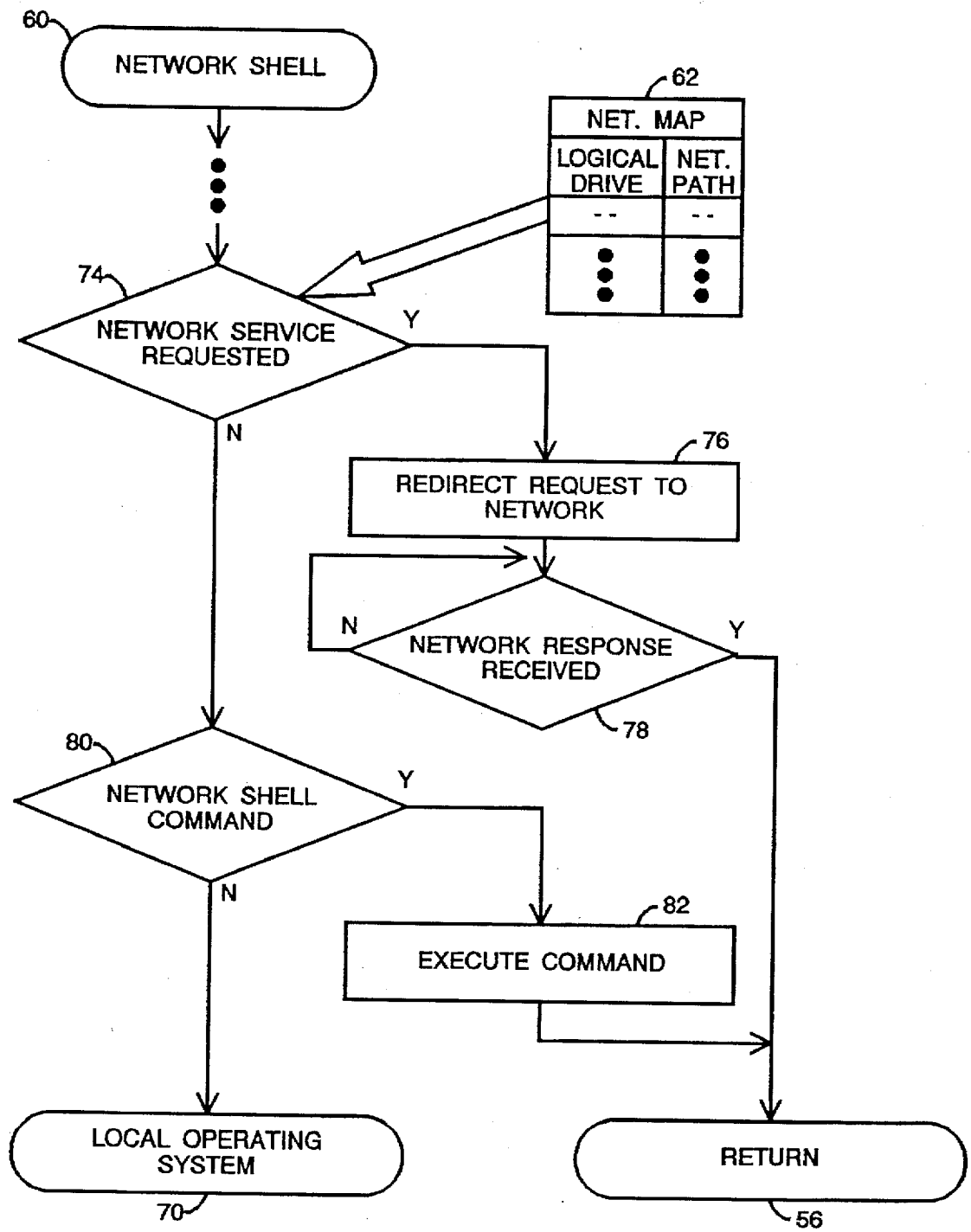
FIG. 6 shows a flow chart of tasks performed in a network shell portion of the software illustrated in FIG. 5.

FIG. 6 shows a flow chart of tasks performed by network shell or redirector 60. Referring now to FIGS. 5 and 6, those skilled in the art will appreciate that shell 60 may perform numerous tasks which are not related to the present invention. However, shell 60 also performs a query task 74, which determines whether service from network 10 has been requested by application 56. Task 74 may consult network map table 62 to determine whether a logical disk or unit number associated with the request has been equated with a network resource, as identified by a file server identifier and a volume identifier. If task 74 determines that network service has been requested, then a task 76 redirects the request 64 toward lower OSI stack program 66 and a node 32 (see FIG. 2) of network 10. Task 76 desirably substitutes a file server identifier and volume identifier for the logical drive or unit number originally associated with request 64.

After task 76, a query task 78 causes program control to wait at task 78 until a response and corresponding data 68 are received from network 10. When data 68 are received, program control returns to the application 56 that called shell 60.

On the other hand, when query task 74 determines that network service is not being requested by application 56, a query task 80 determines whether application 56 sent a network shell command to shell 60. Such commands may include, for example, a MAP command which equates a network path name with a local logical drive or unit number. When task 80 detects a network shell command, a task 82 executes the command and returns program control to application 56. For the MAP command example, task 82 modifies table 62 in accordance with parameters presented with the command. If query task 80 determines that application 56 is not requesting the performance of a network shell command, shell 60 passes program control and the request down to local operating system 70. After operating system 70 responds to the request, program control may be routed back to application 56, either directly from operating system 70 or through shell 60 (not shown).

Accordingly, application level 56 of a workstation 12 may originate a request 64. When the request 64 indicates a need for network resources, that request 64 is redirected through cabling system 16 (see FIGS. 1 and 2) to a file server 14. When file server 14 responds to the request, responsive data 68 are routed back to the requesting workstation 12 and provided to the application 56 which originated request 64.

Figure 7:
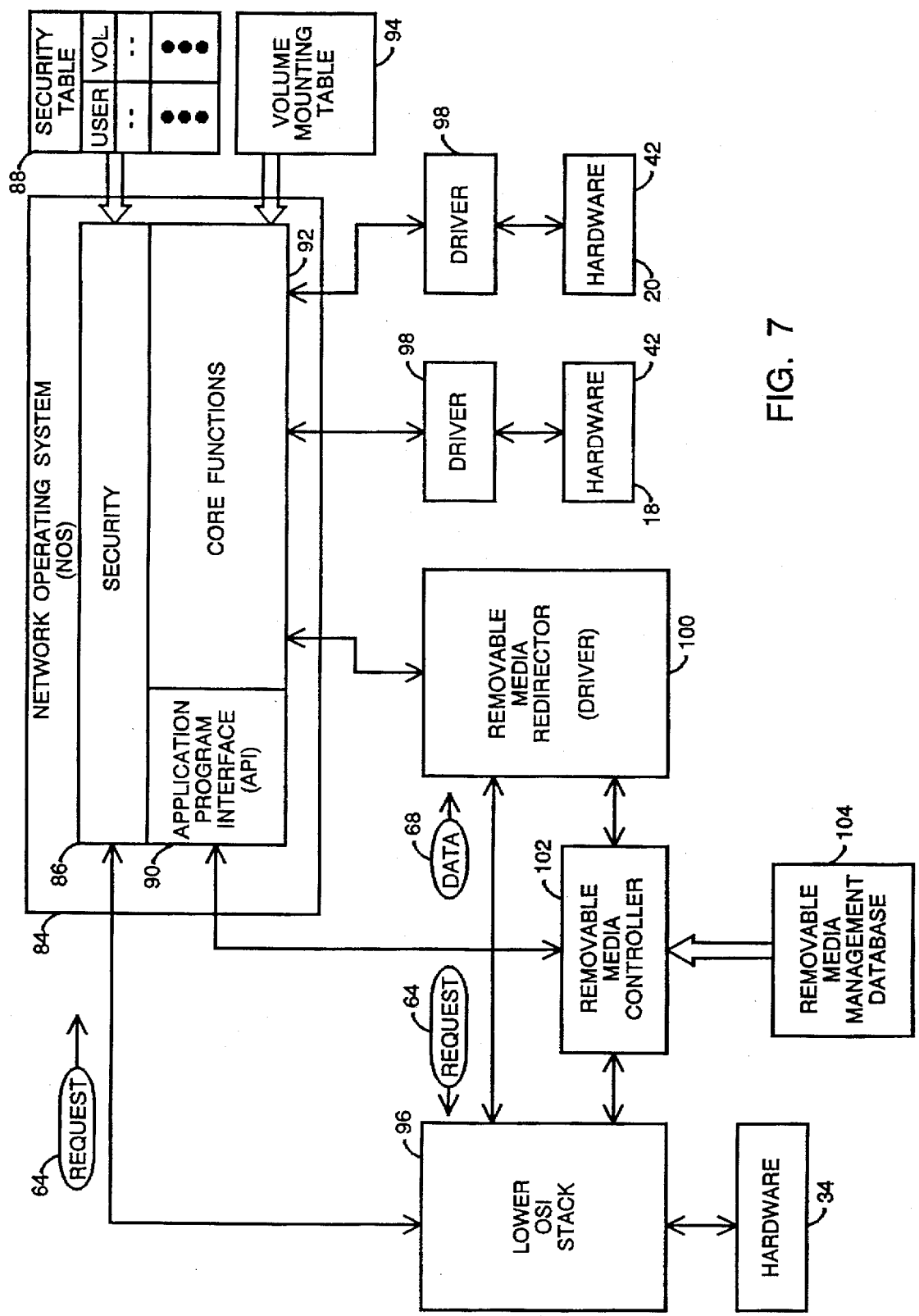
FIG. 7 shows a block diagram of software that operates on a file server node of the network.

FIG. 7 shows a block diagram of software programs that operate on a file server 14. As discussed above in connection with workstation 12, the processes performed in accordance with this software are arranged in a hierarchy. For the purposes of the present invention, application programs (if any) which may run on file server 14 and commands which may be received from a console of file server 14 are not important. Thus, a network operating system (NOS) 84 resides at the top of the hierarchy for the purposes of the present invention. In accordance with the preferred embodiments of the present invention, a conventional NOS, such as the above-discussed NETWARE program or others, serves as NOS 84. Those skilled in the art will appreciate that this and other NOS's are highly sophisticated and relatively expensive programs that provide many valuable functions for network 10. In order to achieve high standards of efficiency and reliability, these functions and the expenses associated therewith are not duplicated frivolously in network 10.

NOS 84 may be partitioned into at least three distinct programs. A security program 86 overlies the remainder of NOS 84. Security program 86 manages passwords and log-on's to network 10. Network users are identified through their passwords. Security program 86 allows some minor network resources or services to be provided to users that have no recognized password. However, security program 86 desirably associates network users, as identified by their passwords, with volume identities through a security table 88. FIG. 7 shows a block diagram of an exemplary memory structure maintained in memory 38 (see FIG. 2) of file server 14 or through drives 50 and/or 52 (see FIG. 4) of file server 14 that may be used to implement table 88. Through the associations defined in table 88, security program 86 may allow certain users access to certain of its volumes and deny this access to other users.

Underneath security program 86, NOS 84 includes one or more application program interfaces (APIs) 90. API 90, which is well known and not discussed in detail herein, provides a well-defined, consistent route through which a program running outside NOS, such as an application program or a NETWARE Loadable Module (NLM), discussed below, can obtain system services.

In addition, NOS 84 includes numerous core functions 92. Of the numerous core functions 92, complementary MOUNT and DISMOUNT functions are particularly relevant to the currently preferred embodiment of the present invention. These functions are relevant because the currently preferred embodiment of the present invention treats each removable medium 30 (see FIG. 1) as an individual volume relative to file server 14. In other words, these functions allow a file server 14 to manage the volumes that fall within the file server's jurisdiction. In short, volumes must be mounted in order for them to be placed in service on network 10. When a volume is mounted, NOS 84 creates and manages a volume mounting table 94 in memory 38 (see FIG. 2) of file server 14 for the mounted volume. Table 94 is an extensive data structure that includes many parameters which describe the volume and allows fast access to the volume and the data stored thereon along with efficient caching of the data from the volume. In addition, table 94 includes variables which tell NOS 84 where a driver program (discussed below) is located. The driver program provides access to the volume.

Generally speaking, volumes are not mounted unless they are expected to be used because a table 94 for a mounted volume consumes a considerable amount of the memory 38 (see FIG. 2) available in file server 14. On the other hand, if a volume is not mounted (i.e. is dismounted) it is not available on network 10. Decisions for mounting and dismounting volumes are technical ones which may have a great impact on the performance and reliability of network 10. Consequently, the availability of MOUNT and DISMOUNT commands is typically restricted to supervisors only. In other words, only those persons whose passwords grant them access to the most secure portions of NOS 84 are allowed to issue MOUNT and DISMOUNT commands.

Several different programs may reside beneath NOS 84 in the above-discussed hierarchy. A lower OSI stack program 96 may communicate with NOS 84 and security program 86 thereof. Program 96 is substantially equivalent to the lower OSI stack program 66 discussed above in connection with FIG. 5. The hardware, particularly NIC 34, of file server 14 resides beneath program 96 in the hierarchy. Generally speaking, conventional file server requests, such as the above-discussed request 64 (see FIGS. 5 and 6), are routed to NOS 84 through hardware 34 and lower OSI stack program 96. These requests are filtered by security program 86 before being passed to core functions 92.

Any number of drivers 98 also reside beneath NOS 84 in the above-discussed hierarchy. Drivers 98 represent programs that reformat data being transferred between NOS 84 and particular hardware devices, such as I/O interfaces 42 (see FIG. 4), drives 18 (see FIG. 1), and devices 20 (see FIG. 1). These hardware devices directly attach to file server 14 and are typically located in restricted access area 22 (see FIG. 1). NOS 84 routes requests to appropriate drivers 98 in accordance with the identity of a volume indicated by the request.

As far as NOS 84 is concerned, a removable media redirector 100 represents another driver, like drivers 98. Thus, a request, such as request 64, is routed to removable media redirector 100 when the request indicates a volume identity that has been associated with the "driver" that NOS 84 believes removable media redirector 100 to be. However, removable media redirector 100 is not a driver, and removable media redirector 100 does not communicate with any hardware attached to or installed in file server 14. Rather, removable media redirector 100 sends the request 64 on to lower OSI stack program 96 through prearranged sockets. Sockets are well known interfaces in stack program 96 through which peer-to-peer and other communications are arranged. Through OSI stack program 96, removable media redirector 100 indirectly communicates the request 64 to a removable media server 24 that may be distally located from file server 14. Removable media server 24 desirably responds to the request and communicates responsive data 68 back through hardware 34 and lower OSI stack program 96 to removable media redirector 100. Removable media redirector 100 then routes data 68 back up through NOS 84, where NOS 84 transfers the data 68 through lower OSI stack program 96 to the requesting workstation 12 using conventional processes which are included in NOS 84. Removable media redirector 100 is discussed in more detail below in connection with FIG. 8.

Figure 9:
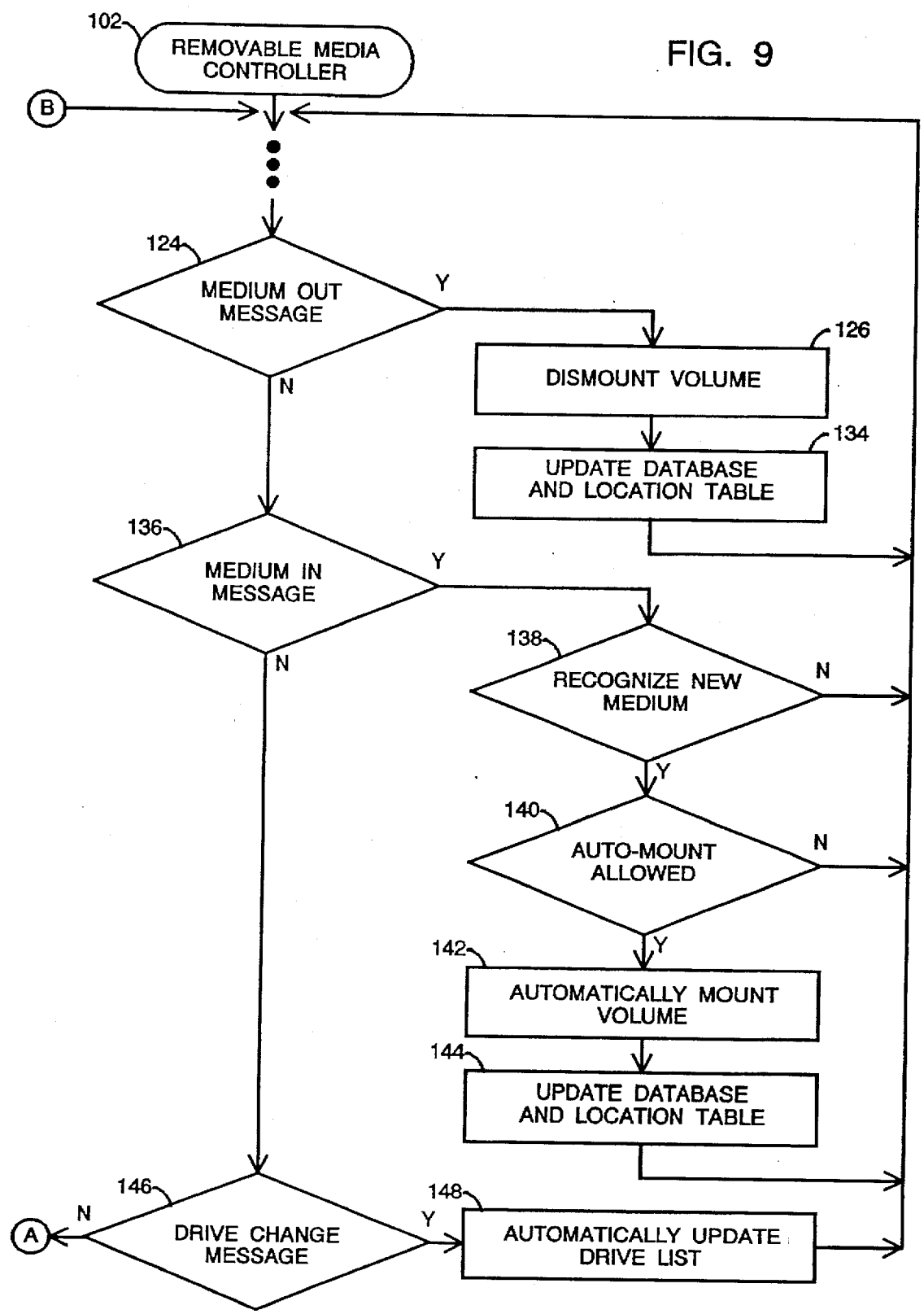
FIGS. 9-10 show a flow chart of a removable media controller portion of the software illustrated in FIG. 7.
Figure 10:
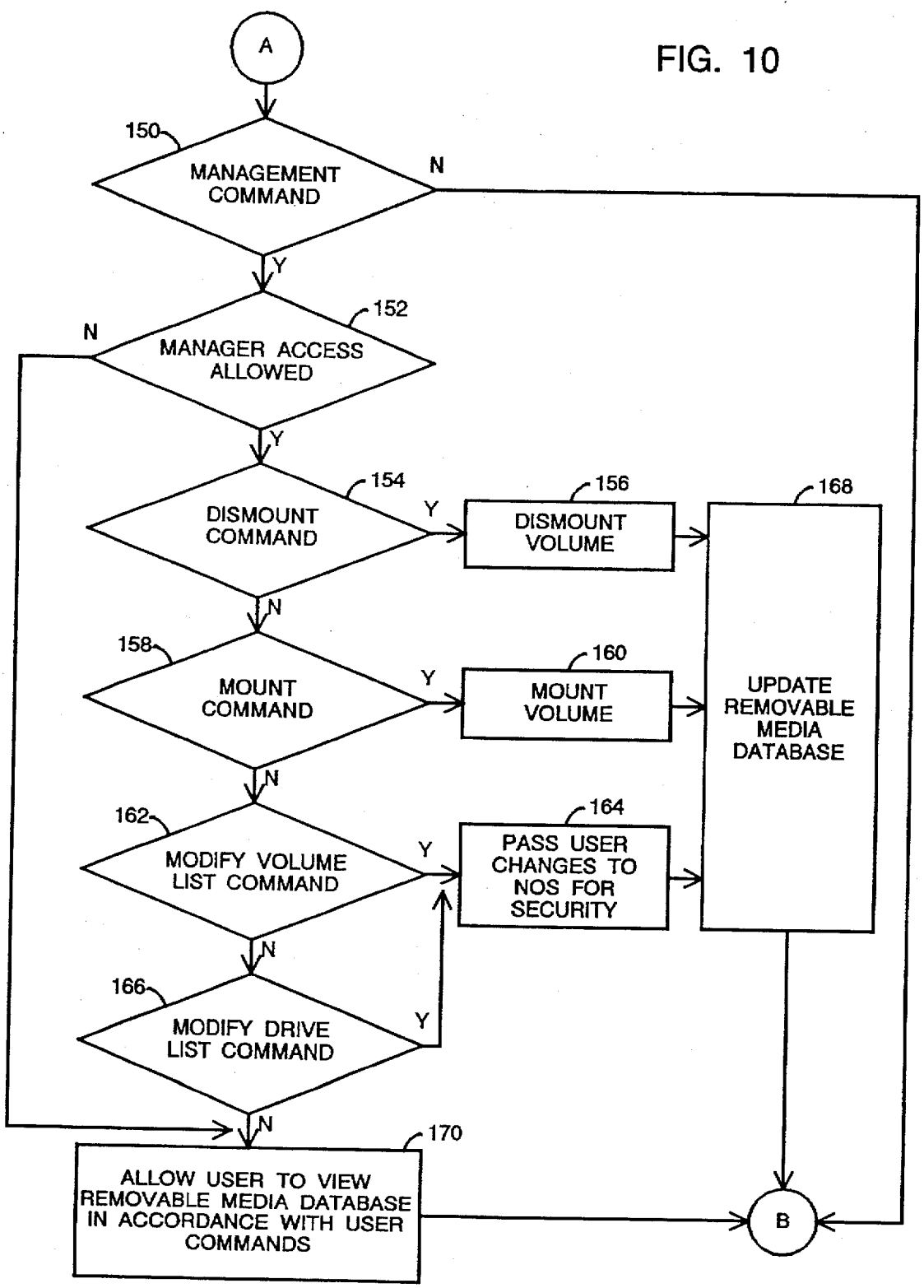
Figure 11:
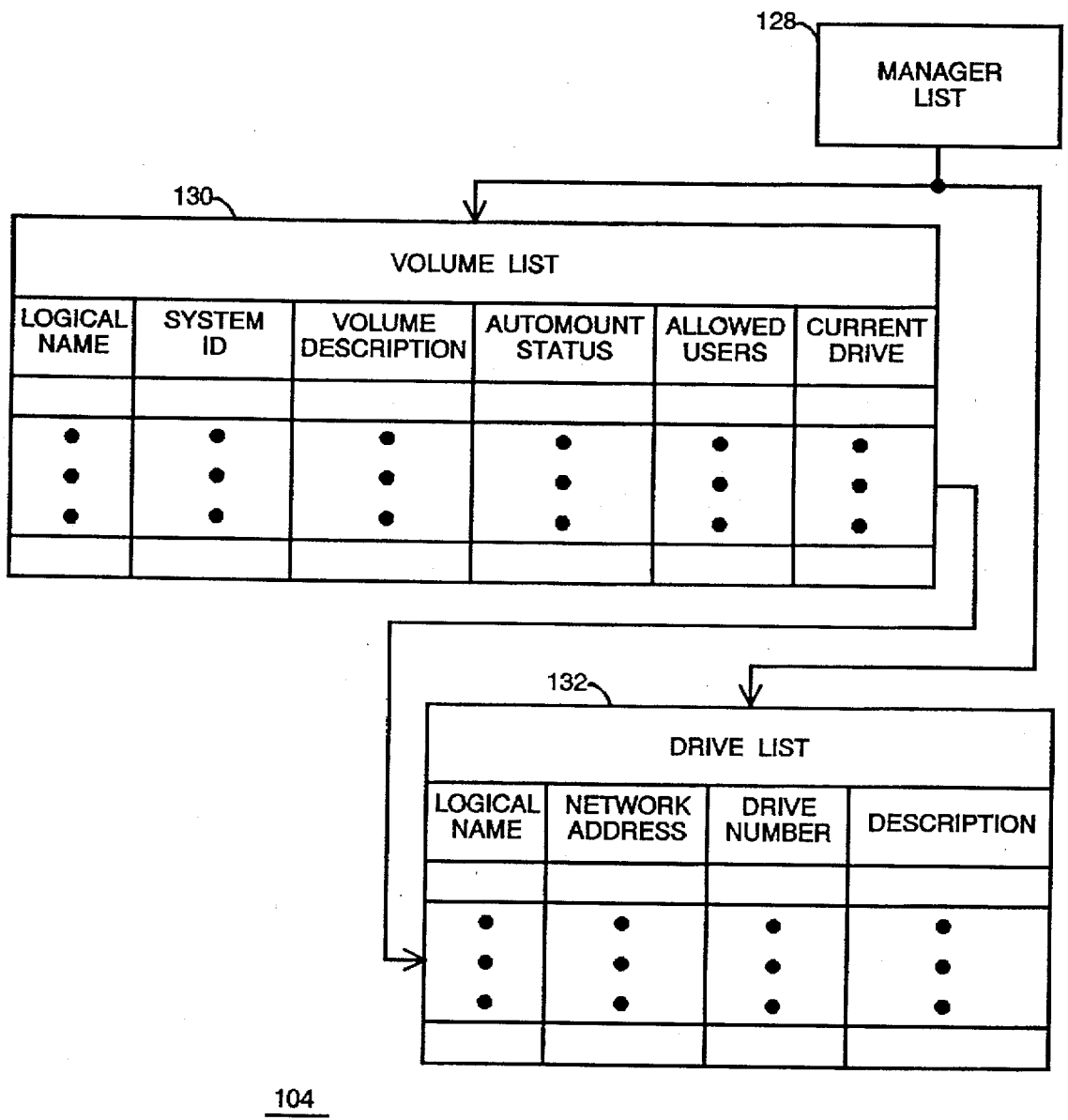
FIG. 11 shows a block diagram of a removable media database memory structure managed at the file server of the network.

Removable media redirector 100 also communicates, in some situations, with a removable media controller 102. Removable media controller 102 represents an NLM or other resident program which operates on file server 14 and which resides under NOS 84. Removable media controller 102 communicates with NOS 84 through API 90. Generally speaking, removable media controller 102 manages a removable media management database 104 and issues commands to NOS 84 to aid in the management of removable media 30 and removable media servers 24. Database 104 represents a data structure which is maintained at file server 14, preferably in non-volatile memory such as a hard disk drive. The commands issued to NOS 84 by controller 102 are not screened by security program 86 because removable media controller 102 is already resident at file server 14. By bypassing security program 86, controller 102 gives some network users the ability to invoke some protected commands, such as MOUNT and DISMOUNT commands, without giving this ability to all users and without giving access to all protected commands. Removable media controller 102 is discussed below in connection with FIGS. 9-10, and FIG. 11 presents a block diagram of an example of database 104.

Accordingly, while removable media server 24 may be located remotely from file server 14, NOS 84 manages removable media volumes 30 accessible through removable media server 24. The benefits of security program 86 and of the high speed access achievable through tables 94 are extended to removable media 30 without requiring an inefficient duplication of functions in network 10 and without requiring the installation of extraneous hardware in file server 14. Moreover, file server 14 may be physically located in restricted access area 22 (see FIG. 1) without imposing any similar restriction on removable media server 24. Thus, network users who may not have access to area 22 may still change media 30 in drives 26 (see FIG. 1), and drives 26 may be placed at several different convenient locations for network users.

Figure 8:
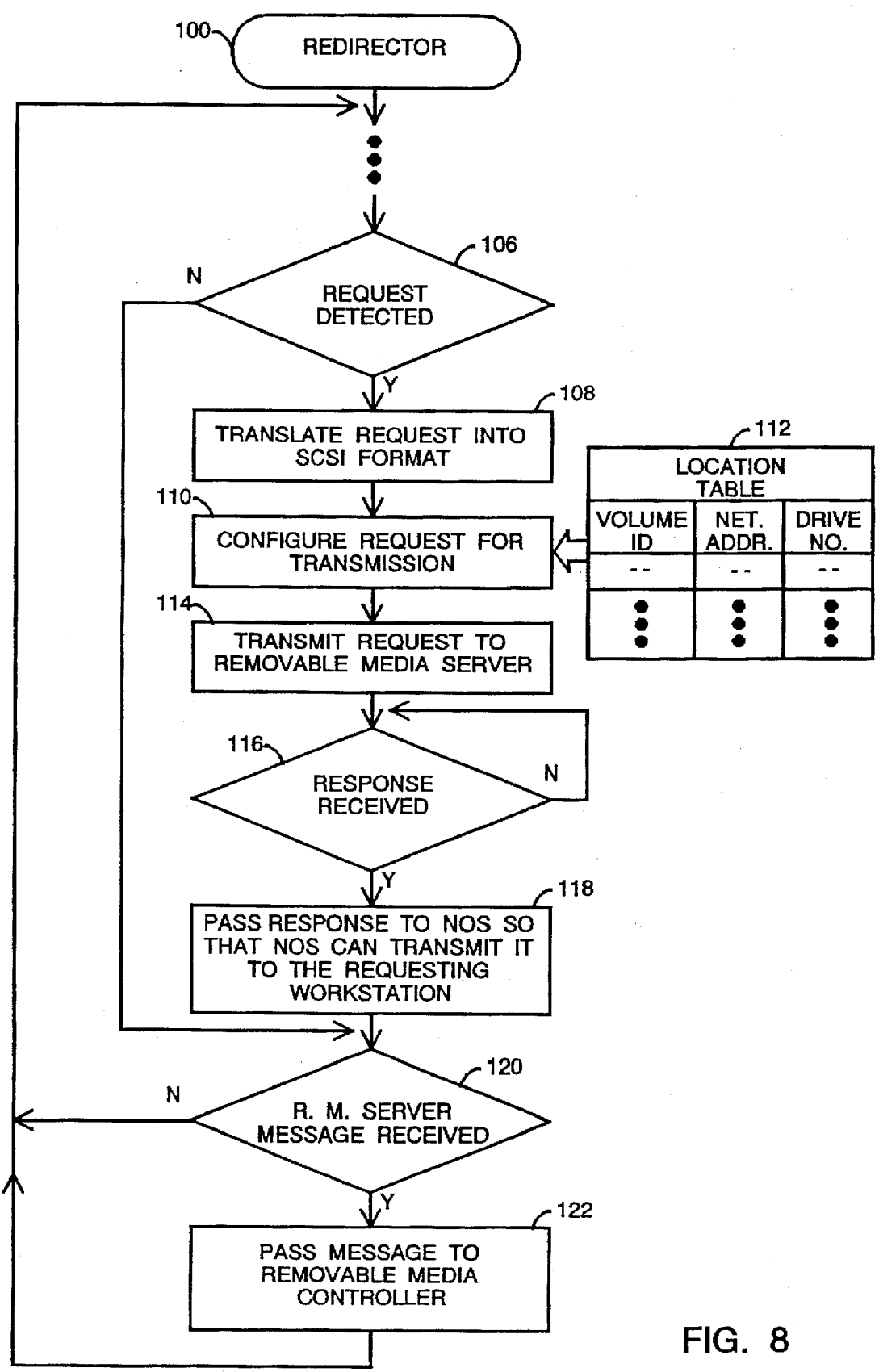
FIG. 8 shows a flow chart of a redirector portion of the software illustrated in FIG. 7.

FIG. 8 shows a flow chart of tasks performed in file server 14 by removable media redirector 100. Those skilled in the art will appreciate that redirector 100 may perform housekeeping and other minor tasks which do not directly relate to the present invention. In addition, redirector 100 performs a query task 106 that detects a request, such as the above-discussed request 64. When received at redirector 100, request 64 may have been translated by NOS 84 into a form which is compatible with the needs of NOS 84 (see FIG. 7), as dictated through the definitions presented in volume mounting table 94. If task 106 detects such a request 64, a task 108 translates this request into a format which is compatible with SCSI data communications. Desirably, task 108 translates request 64 into a standardized host adapter format, such as an Advanced SCSI Programming Interface (ASPI) or a Common-Access Method (CAM), which are well known to those skilled in the art.

After task 108, a task 110 configures request 64 into a format which is suitable for transmission within network 10. For example, conventional ASPI or CAM interfaces may define or reserve unused data locations into which read data will be placed. However, such data locations are unnecessary at this point and contain only invalid data before data is actually read from a data storage medium. A more efficient use of network resources results from stripping such data in task 110 prior to transmission through network 10. In addition, task 110 may desirably translate a volume ID received from NOS 84 into a specific network address for removable media server 24 along with a drive number corresponding to the one of removable media drives 26 (see FIG. 1) where the desired medium 30 (see FIG. 1) currently resides. This translation may be accomplished by consulting a location table 112, maintained in memory 38 (see FIG. 2) of file server 14 by removable media controller 102 (see FIG. 7).

Next, a task 114 transmits the translated request 64 to removable media server 24. This transmission is accomplished by passing the request to lower OSI stack 96 through a previously arranged socket number in a conventional manner. After task 114, a query task 116 causes program control within redirector 100 to pause until a response, such as responsive data 68 (see FIG. 7), is received back at redirector 100. These responsive data 68 are received from lower OSI stack 96 after being sent to file server 14 from removable media server 24.

When responsive data 68 are received, a task 118 passes the response to NOS 84. Task 118 may also perform any translation on the data which may be required to place the data in a format suitable for NOS 84. From the perspective of NOS 84, responsive data 68 are received in the same manner as any other data received from other drivers 98 (see FIG. 7). Thus, NOS 84 transfers the data 68 from file server 14 through cabling system 16 (see FIG. 1) to the requesting workstation 12 using the same processes it uses in transferring any other file server data within its jurisdiction in response to a request for such data.

When task 106, discussed above, fails to detect a request 64 (see FIGS. 5 and 7) or after task 118, redirector 100 performs a query task 120. Task 120 determines whether an unsolicited message has been received from removable media server 24. Such a message may be received at redirector 100 through lower OSI stack 96 through a previously-established socket arrangement. Unsolicited messages may, for example, inform file server 14 that a removable media server 24 has detected a change in the media 30 or in drives 26 within its jurisdiction. When an unsolicited message has been received from a removable media server 24, a task 122 passes the message to removable media controller 102 (see FIG. 7). Removable media controller 102 then takes appropriate action in response to the message, as discussed below in connection with FIGS. 9-11. After task 122 and when task 120 fails to detect an unsolicited message from removable media server 24, program control returns to task 106, discussed above, to repeat the above-discussed tasks.

Of course, those skilled in the art will appreciate that the flow chart shown in FIG. 8 is presented to illustrate the tasks performed by redirector 100 and that these tasks may have many different configurations. For example, redirector 100 need not operate in a continuous loop as indicated in FIG. 8. Rather, redirector 100 may be invoked whenever any request, data, or message to be routed through it is detected at file server 14. Likewise, whether or not redirector 100 operates in a continuous loop, those skilled in the art will appreciate that such a loop would not prohibit file server 14 from engaging in other tasks if interrupted or otherwise temporarily diverted away from redirector 100.

FIGS. 9–10 show a flow chart of tasks performed by removable media controller 102. As discussed above, removable media controller 102 manages removable media management database 104, a block diagram of which is shown in FIG. 11, and issues commands to NOS 84 (see FIG. 7) to aid in the management of removable media 30, removable media drives 26, and removable media servers 24. As with redirector 100 (see FIG. 8), FIGS. 9–10 depict removable media controller 102 as operating in a continuous loop for convenience. However, those skilled in the art will appreciate that alternate programming configurations may use other techniques to invoke the various tasks performed by removable media controller 102.

Those skilled in the art will appreciate that removable media controller 102 may perform housekeeping and other tasks which do not directly relate to the present invention. In addition, removable media controller 102 performs a query task 124 to detect whether an unsolicited Medium Out message has been received from removable media server 24, via redirector 100 as discussed above in connection with FIG. 8. The Medium Out message informs removable media controller 102 that a removable media server 24 has detected the removal of a medium 30 (see FIG. 1) previously loaded in one of its drives 26 (see FIG. 1). This message identifies the medium 30 which has been removed. Alternatively, or in addition, the message may identify the removable media server 24 and drive 26 associated with the removed medium 30.

When task 124 detects a Medium Out message, a task 126 dismounts the indicated medium 30. As discussed above, media 30 are associated with volumes in a one to one correspondence. Thus, task 126 dismounts the logical volume associated with the physical medium 30 that has been removed. Dismounting is accomplished by sending a DISMOUNT command through API 90 (see FIG. 7) to NOS 84. Since removable media controller 102 is a resident NLM on file server 14, this command essentially bypasses security program 86 (see FIG. 7). In other words, the DISMOUNT command is not blocked by security program 86 and NOS 84 performs the command. By DISMOUNTING the volume associated with the removed medium 30, NOS 84 frees the memory space used by an associated volume mounting table 94 (see FIG. 7).

Task 126 may consult removable media management database 104 in constructing the DISMOUNT command sent to NOS 84. FIG. 11 shows an exemplary block diagram of database 104. As shown in FIG. 11, database 104 may include a manager list 128, a volume list 130, and a drive list 132.

Manager list 128 identifies the passwords of persons who are given authority to manage removable media use on network 10. These removable-media-use-managers typically have a librarian role in the administration of network 10, as contrasted with supervisors who have more technical and security-oriented roles. List 128 may directly identify these passwords or may include pointers which tell where, within network 10, such passwords may be found. In the preferred embodiment, only a supervisor has the authority to install removable media redirector 100 and removable media controller 102 (see FIG. 7) on file server 14. In addition, the supervisor may have the authority to name the managers whose passwords are listed in list 128. This installation is performed through the execution of an installation module of removable media management program 58, discussed above in connection with FIG. 5. Conventional installation techniques are used in the preferred embodiments of the present invention. Conventional database management techniques may be employed to identify manager passwords through list 128.

Volume list 130 associates media or volume related data together in an organized manner. For example, each medium 30 may have a logical name recognized by network users and/or NOS 84. The same media may, but need not, also have a unique ID code. A lengthy description may be included to provide network users with greater information about the indicated medium 30 and its use. In addition, a status field indicates whether removable media controller 102 is permitted to automatically mount the volume equated with the medium 30. Other fields may identify network users who are permitted to use the volume and the current drive (if any) where the medium 30 is installed.

Drive list 132 associates data describing removable media drives 26 together in an organized manner. For example, each removable media drive 26 may have a logical name which is recognized by network users and/or NOS 84. That name may differ from, but be associated with, a network address for communicating with the removable media server 24 that manages the drive 26 and a drive number of the drive 26 relative to the managing removable media server 24. When a medium 30 is loaded in a drive 26, the current drive field of volume list 130 may point to or otherwise identify the record in drive list 132 that describes where the medium 30 is loaded.

With reference back to FIG. 9, when task 126 constructs a DISMOUNT command, it may reference volume list 130 to obtain an appropriate logical name to include in the command. After task 126 sends the DISMOUNT command or function call to NOS 84, a task 134 updates database 104 (see FIG. 11) and location table 112 (see FIG. 8) to indicate that no current drive number is assigned to the removed medium 30. After task 134, program control returns to task 124 to look for another command or message which may be directed to removable media controller 102.

When task 124 fails to detect a Medium Out message, controller 102 uses a query task 136 to determine whether a Medium In message has been received at file server 14. As discussed above, this message may be received from removable media server 24, via redirector 100. The Medium In message informs removable media controller 102 that a removable media server 24 has detected the loading of a medium 30 (see FIG. 1) in one of its drives 26. This message identifies the medium 30 which has been loaded along with the identity of the removable media server 24 and drive 26 associated with the loaded medium 30.

When task 136 detects a Medium In message, controller 102 performs a query task 138. Task 138 determines whether the newly loaded medium is recognized. Task 138 may consult volume list 130 of database 104 (see FIG. 11) in making its determination. Task 138 verifies that list 130 includes a record for the newly loaded medium 30. If a record exists, the medium 30 has been recognized. If no record exists for the medium 30 in list 130, then the medium is not recognized. Task 138 tests for recognition of the new medium 30 in order to determine whether to automatically mount the new medium. If a newly loaded volume cannot be recognized, then controller 102 will not permit it to be automatically loaded. This control allows the manager of removable media use on network 10 to maintain control over what media are placed in service on network 10. Network users may not be allowed to place unwanted removable media, such as games or perhaps potentially sensitive data, in service on network 10 unless approved by the manager. If the newly loaded medium 30 is not recognized, program control loops back to task 124 to look for another command or message which may be directed to removable media controller 102. Of course, those skilled in the art will appreciate that controller 102 may, before looping back to task 124 (not shown), format and send an appropriate error report to inform network users that the new medium is not recognized and will not be mounted.

When task 138 determines that the newly loaded medium 30 is recognized, a query task 140 determines whether automatic mounting of the medium 30 is allowed. Task 140 may again consult volume list 130 of database 104 (see FIG. 11) in making this determination. A status field of the record in list 130 for the newly loaded medium 30 defines whether or not to allow automatic mounting. The removable media-use-manager-completes this field when the manager identifies a removable medium 30 to network 10 through tasks that are discussed below. This field may be set to refuse automatic mounting for sensitive data. As will be discussed below, the manager may manually mount a volume to keep tight control on sensitive data. On the other hand, for less sensitive data any network user may simply place a medium 30 in a drive 26 and the volume/medium 30 will automatically mount. If this status field indicates that automatic mounting is not allowed, removable media controller 102 refrains from automatically mounting the volume/medium 30. Rather, program control loops back to task 124 to look for another command or message which may be directed to removable media controller 102. Of course, those skilled in the art will appreciate that controller 102 may, before looping back to task 124 (not shown), format and send an appropriate error report to inform network users that automatic mounting is not allowed for the new medium.

When task 140 verifies that automatic mounting is allowed, a task 142 mounts the medium 30. Automatic mounting is performed by issuing a MOUNT command or function call to NOS 84 through API 90 (see FIG. 7). Task 142 may consult volume list 130 to obtain an appropriate logical name to include with the mount command. After task 142, a task 144 updates database 104 (see FIG. 11) and location table 112 (see FIG. 8) to reflect the mounting of the newly loaded medium 30. Task 144 updates database 104 by recording the removable media server's network address and drive number where the newly loaded medium 30 resides in drive list 132 (see FIG. 11). After task 144, program control loops back to task 124 to look for another command or message which may be directed to removable media controller 102.

When task 136 fails to detect a Medium In message, controller 102 uses a query task 146 to determine whether a Drive Change message has been received at file server 14. As discussed above, the Drive Change message arrives from removable media server 24, via redirector 100. The Drive Change message informs controller 102 that a removable media server 24 has detected either the removal of a drive 26 (see FIG. 1) previously coupled to bus 28 (see FIG. 1) or the addition of a drive 26 not previously coupled to bus 28. When task 146 detects the Drive Change message, a task 148 automatically updates drive list 132 of database 104 (see FIG. 11) to reflect the change. An existing record in drive list 132 will be removed when a drive 26 disappears from bus 28 and a new record will be added to drive list 132 when a drive 26 appears on bus 28. After task 148, program control loops back to task 124 to look for another command or message which may be directed to removable media controller 102.

When task 146 fails to detect a Drive Change message, controller 102 uses a query task 150 (through connector "A" in FIGS. 9 and 10) to determine whether a management command has been received at file server 14 from removable media management program 58 (see FIG. 5) running on a workstation 12. Program 58 uses conventional database management techniques to issue management commands to controller 102. These commands cause controller 102 to access and engage in various actions toward database 104 (see FIG. 11). Preferably, only a removable-media-use-manager, as determined by manager list 128 of database 104, may be permitted to execute a "Manage" module of program 58, but any network user may execute a "User" module of program 58. These management commands are preferably transmitted through peer-to-peer communications established between program 58 and removable media controller 102. Such communications are desirably routed through a prearranged socket in lower OSI stack 96 (see FIG. 7). If no management command is detected at task 150, program control loops back to task 124 (through connector "B" in FIGS. 10 and 9) to look for another command or message which may be directed to removable media controller 102.

When task 150 detects a management command, a query task 152 determines whether management access to database 104 is permitted for the command. As discussed above, management access may be determined by evaluating manager list 128 of database 104. If the network user sending the command to removable media controller 102 has management access, then that manager may modify database 104 and mount or dismount volumes.

For example, when the command has manager access, a query task 154 determines whether the command is a Dismount command. If so, a task 156 accomplishes the dismount by issuing the appropriate DISMOUNT command or function call to NOS 84. Since the DISMOUNT command goes to NOS 84 from removable media controller 102, security program 86 (see FIG. 7) is bypassed. As discussed above, by bypassing security program 86, managers can invoke otherwise protected network functions, such as MOUNT and DISMOUNT. If the command is not a Dismount command but rather a Mount command, then a query task 158 routes program control to a task 160 which performs a complementary function to task 156. If the command represents a request to modify volume list 130 (see FIG. 11), a query task 162 routes program control to a task 164, and if the command represents a request to modify drive list 132, a query task 166 also routes program control to task 164. Task 164 passes any changes in users who are permitted to access particular volumes associated with media 30 to NOS 84 so that NOS 84 may implement its normal security procedures with respect to that volume and those users.

After any of tasks 156, 160, or 164, a task 168 updates or otherwise modifies database 104 (See FIG. 11). The manager may identify new media 30 which are being placed in service and identify users who are permitted to access the media 30 and volume names to associate with the media 30. The manager may also define whether to allow automatic mounting of the media, as discussed above in connection with task 142 (see FIG. 9). Likewise, when media 30 are mounted or dismounted database 104 is modified accordingly. Task 168 also allows the manager to define logical names and provide descriptions, such as physical locations, for drives in drive list 132. Task 168 uses conventional database management techniques in modifying database 104. After task 168, program control loops back to task 124 (through connector "B" in FIGS. 10 and 9) to look for another command or message which may be directed to removable media controller 102.

If a command detected in removable media controller 102 is not restricted to use by a manager, a task 170 is performed. Task 170 allows a user to view data stored in database 104 in accordance with various commands the user may issue. Conventional database and data formatting techniques are used by task 170 to allow the user, whether or not a manager, to view certain data in database 104. Thus, a user may determine which media are available to the user for use on network 10, whether or not they are currently mounted, and where various drives 26 (see FIG. 1) may physically reside. After allowing a user to view database 104 or a portion of it, program control loops back to task 124 (through connector "B" in FIGS. 10 and 9) to look for another command or message which may be directed to removable media controller 102.

Any network user may view database 104 to determine which media 30 are currently available. If a user wishes to access a medium 30 that is not currently mounted but may be automatically mounted, then the user, whether or not a manager, may simply obtain the medium 30 and load it in a drive 26 (see FIG. 1). The manager need not be bothered. On the other hand, if a medium 30 is not listed in database 104 or if the medium 30 is not currently mounted and not automatically mountable, then the user must consult the removable-media-use-manager to gain access to the medium 30 through network 10. A network supervisor is not required to mount and dismount or otherwise be involved with media 30. At the same time, a removable-media-use-manager may exercise as much control over removable media 30 as he or she desires.

Figure 12:
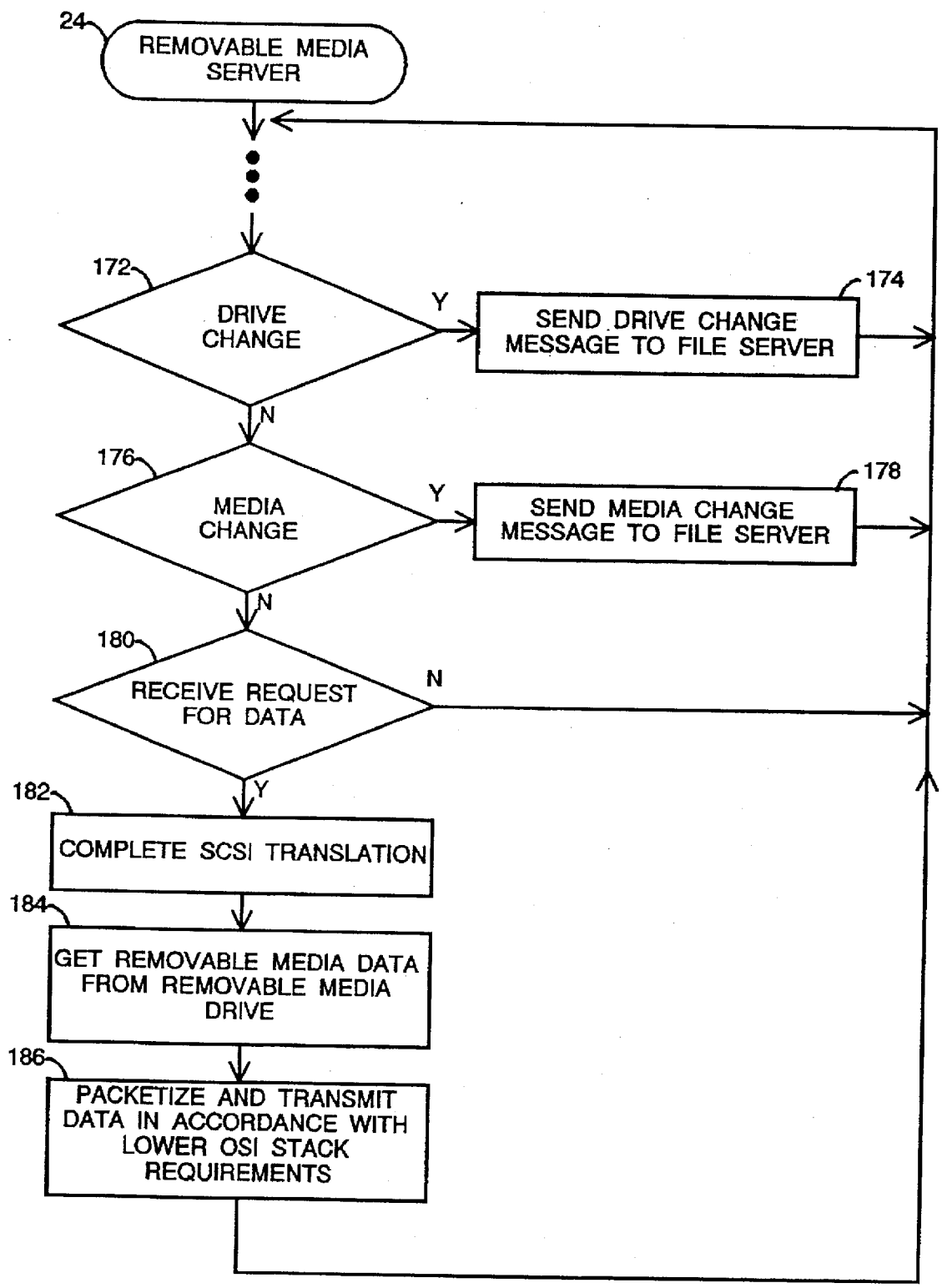
FIG. 12 shows a flow chart of software performed at a removable media server portion of the network.

FIG. 12 shows a flow chart of tasks performed by removable media server 24. Those skilled in the art will appreciate that removable media server 24 may perform housekeeping and other overhead tasks which do not directly relate to the present invention. In addition, removable media server 24 performs a query task 172 to determine whether a drive 26 (see FIG. 1) change appears on bus 28 (see FIG. 1).

A drive change results from either removing a previously available drive 26 or adding a previously unavailable drive 26. Those skilled in the art will appreciate that fixed drives and media function in a manner equivalent to removable drives and media for the purposes of the present invention through such removal and addition. Task 172 may make its determination by attempting to access all possible drives 26 which may be located on bus 28. In the preferred embodiment of the present invention, bus 28 is a SCSI bus. Thus, up to seven of drives 26 may couple to bus 28. If previously installed drives 26 fail to respond to a request for access from removable media server 24, or if previously un-installed drives 26 respond to a request for access from removable media server 24, then task 172 detects a change. When task 172 detects a drive change, a task 174 constructs and sends the above-discussed Drive Change message to file server 14. As discussed above, removable media controller 102 (see FIGS. 7 and 9) responds by modifying database 104 (see FIG. 11). After task 174, program control loops back to task 172 to continue the operation of removable media server 24.

When task 172 fails to detect a drive change, a query task 176 determines whether a media change has taken place in any of the drives 26 controlled by removable media server 24. In accessing drives 26, as discussed above in connection with task 172, removable media server 24 may request the drives 26 to read a serial number associated with any removable media loaded therein. Removable media server 24 may keep a list (not shown) which tracks the media 30 loaded in its drives 26. When media 30 are not loaded in drives 26, or when unrecognized serial numbers are associated with media 30 loaded in drives 26, changes are detected. When task 176 detects a media change, a task 178 formats and sends a media change message back to file server 14. A Medium Out message is sent when removable media server 24 first detects that a drive 26 has no medium 30 loaded therein, and a Medium In message is sent when removable media server 24 detects a previously unrecognized media serial number. After task 178, program control loops back to task 172 to continue the operation of removable media server 24.

When no drive or media changes are detected, a task 180 determines whether a request 64 (see FIGS. 5 and 7) has been detected at removable media server 24. As discussed above, this request was transmitted from file server 14 after being received from a workstation 12. Removable media server 24 need not know the identity of the workstation 12 originating request 64. If task 180 fails to detect a request 64, program control loops back to task 172 to continue the operation of removable media server 24.

On the other hand, when a request 64 arrives at removable media server 24, a task 182 completes any SCSI translation that may be needed. For example, certain data may be copied from the request and written to appropriate addresses in SCSI control circuit 44 (see FIG. 3). A portion of the request data identifies the drive 26 to use in accessing the data. After task 182, a task 184 obtains removable media data 68 (see FIGS. 5 and 7) that respond to the request. These data are obtained from a removable media drive 26. Those skilled in the art will appreciate that the selected drive 26 uses conventional techniques and circuits to obtain responsive removable media data 68 from the medium 30 loaded therein. Those skilled in the art will further appreciate that request 64 may, in some applications, present data to a drive 26 for storage on medium 30. In such situations, little if any responsive data 68 may be expected in response to request 64.

Next, a task 186 packetizes and transmits responsive data 68 to file server 14 in accordance with lower OSI stack requirements. Task 186 substantially performs the functions of lower OSI stack programs 66 (see FIG. 5) and 96 (see FIG. 7) which run on workstations 12 and file servers 14, respectively. As discussed above, responsive data 68 are transmitted to removable media redirector 100 (see FIG. 7) of file server 14 via peer-to-peer communications taking place through prearranged sockets in these lower OSI stack programs. After task 186, program control loops back to task 172 to continue the operation of removable media server 24.

In summary, the present invention provides an improved computer network that efficiently and reliably provides media services. One or more simple, reliable, and inexpensive media servers attach to a network's cabling system at convenient locations, whether or not near a file server. No dedicated TSR or other programs need to be installed on workstations, and no dedicated hardware needs to be installed in file servers. Consequently, the present invention may be installed on a running network without even temporarily disabling existing file server or workstation nodes of the network. This improved installation improves system reliability. Moreover, the present invention operates under the management provided by existing file server software. Thus, the sophisticated security, file handling, caching, and other functions provided by a network operating system need not be duplicated at a media server. The media server may be provided at relatively low cost and may be expected to provide excellent reliability due to the simplicity which results from not duplicating other network functions.

Furthermore, media and servers are managed through a database which controls whether various media may automatically be mounted or whether a removable-media-use-manager for the network must first be consulted. This manager need not be a network supervisor.

The present invention has been described above with reference to preferred embodiments. However, those skilled in the art will recognize that changes and modifications may be made in these preferred embodiments without departing from the scope of the present invention. For example, the flow charts, block diagrams, and tasks discussed herein have been simplified to help those skilled in the art gain an understanding of the present invention. Those skilled in the art will appreciate that numerous other tasks which are conventional in the operation of computer networks may also be performed. As one example, those skilled in the art will appreciate that appropriate error situations may be detected at appropriate points in the program flow and that corresponding error messages may be constructed and sent to appropriate destinations when such error situations occur. Likewise, different techniques for implementing program flow that do not necessarily lend themselves to flowcharting may be devised. In particular, each task discussed herein may be interrupted to permit program flow to perform background or other tasks. In addition, the order of tasks may be changed, and the techniques used to implement the tasks may differ from system to system. These and other changes and modifications which are obvious to those skilled in the art are intended to be included within the scope of the present invention.

What is claimed is:

1. A method of operating a computer network of the type having a network communication link, at least one file server node connected to the network communication link, and at least one work station node connected to the network communication link, comprising the steps of:

connecting a removable media server to the network communication link, wherein said removable media server couples to a removable media drive which facilitates access to data on removable media;

detecting, at a file server node, a request received over the network communication link from a workstation node;

using said file server node to redirect said request to said removable media server over the network communication link;

servicing said request by said removable media server;

maintaining a list of recognized media;

verifying that a new removable medium is included in said list;

monitoring said removable media drive to detect a change from an old removable medium to said new removable medium; and automatically mounting said new removable medium when said monitoring step detects a change in removable media to place said new removable medium in service on said computer network, said automatically mounting step being performed in response to said verifying step.

2. A method of operating a computer network as claimed in claim 1 wherein:

said list associates a status indication with each of said recognized media in said list, said status indications defining whether automatic mountings of said media are allowed; and said method additionally comprises the step of verifying that said list associates an automatically mountable status with said new removable medium prior to said automatically mounting step.

3. A method of operating a computer network of the type having a network communication link, at least one file server node connected to the network communication link, and at least one workstation node connected to the network communication link, comprising the steps of:

connecting a removable media server to the network communication link, wherein said removable media server couples to a removable media drive which facilitates access to data on removable media;

detecting, at a file server node, a request received over the network communication link from a workstation node;

using said file server node to redirect said request to said removable media server over the network communication link;

servicing said request by said removable media server;

maintaining a list of recognized media, said list associating a status indication with each of said recognized media in said list, said status indications defining whether automatic mountings of said recognized media are allowed;

detecting a change from an old removable medium to a new removable medium;

determining whether said new removable medium is included in said list;

if said new removable medium is included in said list, determining whether said list associates an automatically mountable status with said new removable medium; and refraining from automatically mounting said new removable medium when said new removable medium is not included in said list or when said status indication does not allow automatic mounting of said new removable medium.

4. A method of operating a computer network of the type having a network communication link, at least one file server node connected to the network communication link, and at least one workstation node connected to the network communication link, comprising the steps of:

connecting a removable media server to the network communication link, wherein said removable media server couples through a bus to one or more removable media drives;

detecting, at a file server node, a request received over the network communication link from a workstation node;

using said file server node to redirect said request to said removable media server over the network communication link;

servicing said request by said removable media server;

maintaining, at said file server node, a list of removable media drives available for providing removable media services;

monitoring, at said removable media server, said bus to identify removable media drives available for providing removable media services;

identifying, in response to said monitoring step, whether a change has occurred in said removable media drives available for providing removable media services;

transmitting, when said identifying step detects a change, a message to said file server node; and automatically updating said list in response to said message.

5. A computer network for reliably and efficiently furnishing access to removable media data and having a cabling system, at least one workstation coupled to said cabling system, a file server coupled to said cabling system, said file server being configured to engage in data communications with the at least one workstation, and a removable media drive, wherein the improvement comprises:

a removable media server coupled to said cabling system and to said removable media drive, said removable media server being configured to engage in data communications with said file server;

a removable data storage medium configured for removable coupling to said media drive, said removable data storage medium having said removable media data stored thereon; and a second removable data storage medium configured to removably couple to said removable media drive; wherein said at least one workstation is configured to direct requests for said removable media data over said cabling system to said file server, said file server is configured to redirect requests for said removable media data over said cabling system to said removable media server when said removable data storage medium is mounted relative to said file server, said removable media server is configured to route said removable media data over said cabling system to said file server, and said file server is further configured to route said removable media data over said cabling system to said at least one workstation, said removable media server comprises means for monitoring said removable media drive to determine when said removable data storage medium is coupled thereto and when said second removable data storage medium is coupled thereto, and said file server comprises means, responsive to said monitoring means, for determining whether to automatically mount said second removable data storage medium to place said second removable data storage medium in service on said computer network.

6. A computer network as claimed in claim 5 wherein said file server determining means comprises:

means for maintaining a list of recognized removable data storage media; and means, responsive to said maintaining means, for verifying that said second removable data storage medium is included in said list.

7. A computer network as claimed in claim 6 wherein:

said maintaining means comprises means for associating a status indication with each of said recognized media in said list, said status indications defining whether automatic mountings of said media are allowed; and said determining means further comprises means, responsive to said associating means, for verifying that said list associates an automatically mountable status with said second removable data storage medium.

8. A method of operating a computer network of the type having a network communication link, at least one file server node connected to the network communication link, and at least one workstation node connected to the network communication link, said method comprising the steps of:

connecting a removable media server to the network communication link;

originating a request for a portion of data at a workstation node connected to the network communication link;

redirecting said request from said workstation to a file server node connected to the network communication link;

detecting said request at said file server node;

redirecting said request from said file server node to a media server node connected to the network communication link;

reformatting, in a network operating system executed at said file server, said request into a network compatible request;

detecting said network compatible request at said media server node;

reformatting, in a driver executed at said file server node and at said media server node, said network compatible request into a Small Computer Systems Interface (SCSI) compatible request;

transferring said portion of data from said media server node to said file server node over the network communication link; and transferring said portion of data from said file server node to said workstation node over the network communication link.

9. A method of operating a computer network of the type having a network communication link, at least one file server node connected to the network communication link, and at least one workstation node connected to the network communication link, said method comprising the steps of:

connecting a removable media server to the network communication link, said removable media server being coupled to a removable media drive;

originating a request for a portion of data at a workstation node connected to the network communication link, said portion of data residing on a removable data storage medium and said portion of data being accessible through said removable media drive;

redirecting said request from said workstation node to a file server node connected to the network communication link;

detecting said request at said file server node;

redirecting said request from said file server node to a media server node connected to the network communication link;

detecting said request at said media server node;

transferring said portion of data from said media server node to said file server node over the network communication link;

transferring said portion of data from said file server node to said workstation node over the network communication link;

monitoring said removable media drive to detect a change from an old removable data storage medium to a new removable data storage medium; and determining whether to mount said new removable data storage medium and thereby place said new removable medium in service on said computer network when said monitoring step detects a change in removable data storage media.

10. A method of operating a computer network as claimed in claim 9 wherein:

said method additionally comprises the step of maintaining a list of recognized data storage media;

said determining step comprises the step of evaluating said list to determine whether said new removable data storage medium is included in said list; and said method additionally comprises the step of automatically mounting said new removable data storage medium only when said evaluating step determines that said new removable data storage medium is included in said list.

11. A method of operating a computer network as claimed in claim 10 wherein:

said list associates a status indication with each of said recognized media in said list, said status indications defining whether automatic mountings of said media are allowed;

said evaluating step additionally determines a status indication for said new removable data storage medium; and said automatically mounting step automatically mounts said new removable data storage medium only when said evaluating step determines that said list associates an automatically mountable status with said new removable data storage medium.

12. A method of operating a computer network of the type having a network communication link system with at least one file server node connected to the network communication link and at least one work station node connected to the same network communication link, said method comprising the steps of: connecting a removable media server to the same network communication link; originating a request for a portion of said data at a work station node of said network connected to the same network communication link; redirecting said request from said work station to a file server node of said network connected to the same network communication link; detecting said request at said file server; redirecting said request from said file server to a media server node of said network connected to the same network communication link; detecting said request at said media server node of said network; transferring said requested portion of said data from said media server to said file server over the same network communication link; and transferring said requested portion of said data from said file server to said work station over the same network communication link.

* * * * *